May 25, 1954 — P. P. LOVE — 2,679,438
BEARING HAVING A CROSS SECTIONAL SPIRAL CONTOUR
Filed Jan. 20, 1951 — 2 Sheets-Sheet 1

Phil P. Love

Patented May 25, 1954

2,679,438

UNITED STATES PATENT OFFICE 2,679,438

BEARING HAVING A CROSS SECTIONAL SPIRAL CONTOUR

Phil P. Love, Alperton, Wembley, England, assignor to Johnson Bronze Company, New Castle, Pa., a corporation of Pennsylvania Application January 20, 1951, Serial No. 206,967

Claims priority, application Great Britain January 23, 1950

4 Claims. (Cl. 308—9)

This invention relates to plain bearings, and is particularly concerned with improvements in bearings which are especially applicable for use in grinding machines and other precision machine tools, wherein it is important that a spindle be accurately located and not subject to appreciable movement out of centre when under load.

In some cases it is possible to employ a lubricating film of oil or grease which is so extremely thin that clearance between journal and bearing is itself less than the permissible out-of-centre movement of the journal under load. Such bearing arrangements, however, are very limited as to the load they will carry and, in general, it is essential to provide for the formation of a full fluid film of oil in order to sustain the load without overheating or undue wear, and this requirement necessitates substantial clearance between journal and bearing to allow the building up of an adequate lubricating film by hydrodynamic action. In conventional bearing arrangements, rotation of the journal forms a cushion of oil under pressure which depends on speed, viscosity and clearance, and at a constant adequate speed under no load the journal will tend to run co-axially with the bearing. As a load is applied, however, the journal will be displaced and an oil film pressure will, ipso facto, be created varying from a minimum, substantially zero, over about half the periphery to a maximum at a point corresponding approximately to the direction of maximum load. Under such conditions the journal is permitted to move out of centre substantially in a direction and to an extent depending, inter alia, on the clearance between the journal and bearing, and this movement is excessive in many precision bearing applications.

The present invention has for its object to provide an improved construction of bearing whereby the advantage of full fluid film oil lubrication may be retained while ensuring that the journal will be maintained in substantially accurate co-axial relation with respect to the bearing irrespective of the load and the direction of application thereof.

According to the present invention, in a journal bearing assembly, the bearing or the journal comprises one or more sections arranged so that clearance between journal and bearing decreases in the direction of oil flow which is induced by rotation of the journal relative to the bearing and of such profile that, on rotation of the journal, substantially constant pressure of lubricating oil is created all around the journal under conditions in which no external load or force is applied to the journal.

The invention also includes a journal bearing provided with a bore comprising one or more sections of such profile that, on rotation of the journal, substantially constant pressure of lubricating oil is created all around the journal under conditions in which no external load or force is applied to the journal.

In such a bearing or bearing assembly oil is preferably introduced at or in the neighbourhood of maximum clearance between journal and bearing. When the journal is profiled, the oil may be introduced at a number of spaced positions around the bearing, or through a hole in the journal.

Conditions affecting the profile to be given to the section may include speed of journal, length of bearing, viscosity of oil, and whether outflow of oil from the ends of the bearing is restricted or not.

Under any given set of such conditions, the angle (hereinafter sometimes referred to as the profile slope) between the tangent to the profile and a line at right angles to a radius from the centre of the journal to the point of tangency varies according to the relationship which can be established empirically and can be designed to create any necessary pressures, even of the order of thousands of pounds per square inch.

By such means it is possible to obtain, with no externally applied load on the journal, a considerable substantially constant oil pressure all round the journal so that, when a load or force is applied to the shaft, a negligible change in attitude of the journal within the bearing results, first in an increased pressure between the bearing and the journal opposing the applied load, and, secondly, diametrically opposite to the increased pressure, a decreased pressure, the decrease also effectively opposing the applied load on the journal. The increase in pressure arises from the fact that the small change in attitude has the effect of increasing the ratio of the profile slope to the clearance in the appropriate region and, diametrically opposite, the decrease of pressure arises due to the fact that the ratio of the profile slope to the clearance is decreased.

The invention is hereinafter described, by way of example, with reference to the accompanying diagrammatic drawings, in which.

Figure 1:
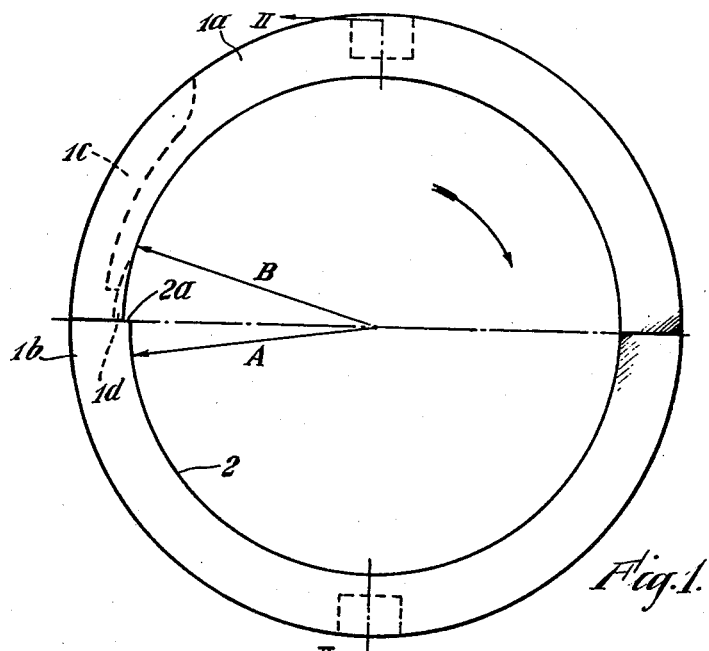
Fig. 1 is an end elevation illustrating one embodiment of journal bearing in accordance with the invention.
Figure 2:
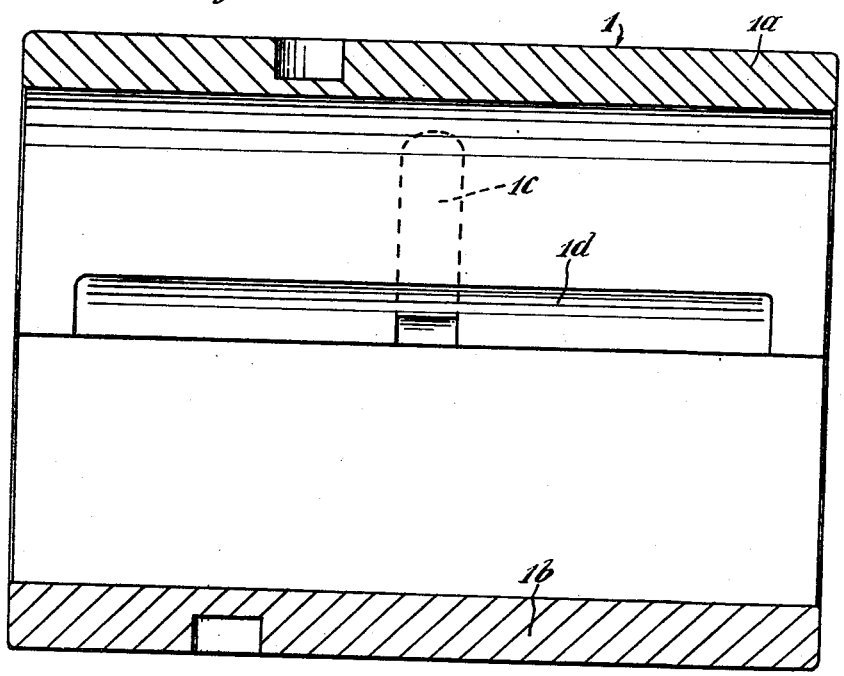
Fig. 2 is a section on the line II—II, Fig. 1.

In carrying the invention into effect, according to one embodiment and with reference more particularly to Figs. 1 and 2 of the accompanying diagrammatic drawings, a journal bearing 1 consisting of two halves 1a, 1b is machined so that the bore 2, instead of being circular in cross-section, is of spiral section. The profile is such that the profile slope, i. e. the angle between a tangent to the bore and a line at right angles to a radius from the centre of the journal to the point of tangency bears a relationship with the clearance which may be exponential, constant or hybrid according to the conditions of side leakage (i. e. at the ends of the bearing or in a direction parallel to the axis of the journal). In practice, the variation in clearance may be, for example, from about 0.001 at A to 0.005 of an inch at B, and the said variation in clearance may be determined experimentally according to the particular conditions of speed, length of bearing, viscosity of oil, and whether the ends of the bearing are open or restricted, by providing a series of tubes connecting various points around the periphery of the bore with pressure gauges, and modifying the curve constant until, under the given conditions, all pressure readings are substantially the same under conditions of no load.

As before stated, the direction of rotation of the journal is from maximum clearance to minimum clearance and oil is introduced through a passage 1c and groove 1d at or in the vicinity of the point of maximum clearance.

It is a feature of this invention that the bearing profile is, in operation, a continuous smooth surface around substantially 360°, there being a step 2a from the minimum clearance to the maximum clearance.

In a preferred embodiment, the pressure at which the oil is introduced is of the same order as that pressure created round the journal under no load conditions.

The oil escapes at the ends of the bearing and it is therefore advantageous to provide the bearing at the ends with truly cylindrical parts with small clearance from the journal so as to hinder outflow of oil and thereby enable the maximum effect of the spiral formation to be obtained.

In the vicinity of the step 2a between minimum and maximum clearance, there may be a region of lower pressure which, however, has small detrimental effect, but in order to obviate this, the bore may be formed with two or more spiral sections displaced angularly with respect to one another so that any imperfection resulting from reduced pressure at the step may be evened out. Thus, if two spiral sections are provided, the optimum relationship is that the steps are diametrically opposed, but even a small amount of angular displacement will be sufficient to establish substantially constant pressure conditions all round the journal.

The direction of application of the load is not critical, but preferably is towards a point in a 180° sector opposite the step in the spiral, when a single spiral is employed.

Instead of providing two or more spiral sections for the purpose referred to, a skew spiral may be provided, i. e. a spiral in which the step follows a helical contour in the length of the bearing.

Figure 3:
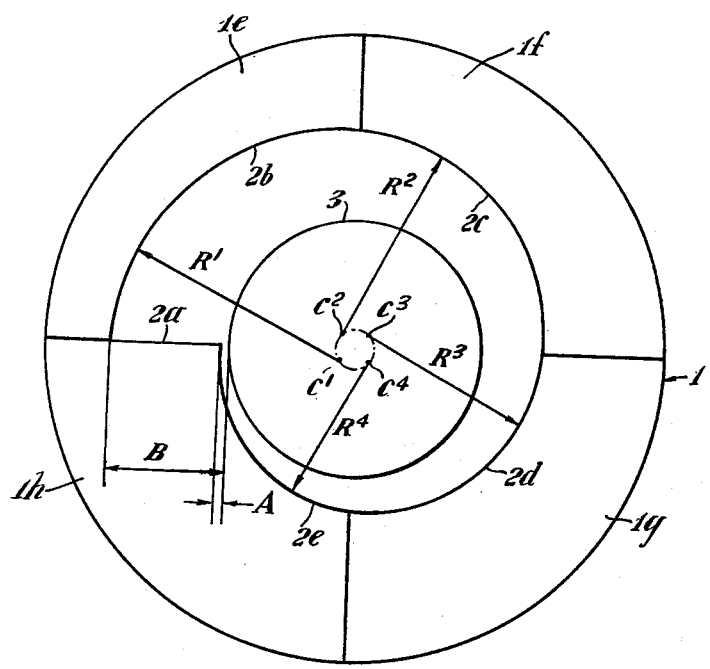
Fig. 3 is a diagrammatic end view illustrating a method of producing a bearing of approximately Archimedean spiral profile, the form of which is exaggerated for the sake of clarity.

A considerable tolerance in the shape of the actual profile is permissible without material detriment to the object of this invention. Thus, a suitable profile may be selected which lends itself to easy manufacture by a variety of means, e. g. by boring a series of segments of progressively decreasing radii and assembling to form a continuous profile. For example, as shown in Fig. 3, the journal bearing 1 may consist of four segments, i. e. 1e, 1f, 1g, 1h. The segment 1e is bored from a centre $c^1$ at a radius $R^1$; the segment 1f is bored from a centre $c^2$ at a radius $R^2$; the segment 1g is bored from a centre $c^3$ at a radius $R^3$; and the segment 1h is bored from a center $c^4$ at a radius $R^4$. For use with a journal 3 having a diameter of 3.75 inches, $R^1$ may be 1.8825 inches; $R^2$ 1.8805 inches; $R^3$ 1.8785 inches; $R^4$ 1.8765 inches, the centres $c^1$, $c^2$, $c^3$, $c^4$ being positioned so that when assembled the surfaces 2b, 2c, 2d, 2e of the respective segments 1e, 1f, 1g, 1h form a spiral profile having a minimum clearance A of 0.0015 in an inch and a maximum clearance B of 0.0075 of an inch.

Alternatively, a pair of substantially 180° segments may be bored while subjected to a progressive bending movement related to the desired profile.

Instead of forming the journal bearing with a bore of spiral profile, the journal itself may be shaped to have an equivalent spiral cross-section for use with a journal bearing having a cylindrical bore.

It will be understood that the invention is not limited to the particular embodiments herein-before described. For example, a journal bearing may embody two or more bearing sleeves each having a bore of spiral section as before described, said sleeves being located in a housing so that the respective spiral sections are offset angularly. Similarly, the bearing assemblage may include separately formed end sections having truly cylindrical bores. The invention may also be adapted for use on conical bearings.

I claim:

1. A journal assembly including a bearing having a cross sectional spiral contour which extends substantially 360 degrees, and a journal for the bearing adapted to be lubricated and rotated therein from a maximum clearance between the bearing and the journal to a minimum clearance whereby substantially constant pressure of the lubricant is created completely around the journal under conditions in which no external force is applied thereto.

2. A journal assembly including a bearing having a cross sectional spiral contour which extends substantially 360 degrees, a lubricant, and a substantially cylindrical journal for the bearing adapted to rotate therein in a direction from a maximum clearance between the bearing and the journal to a minimum clearance whereby substantially constant pressure of the lubricant is created completely around the journal under conditions in which no external force is applied thereto.

3. A journal assembly including a bearing having a cross sectional Archimedean spiral contour which extends at least 360 degrees, a lubricant, means to introduce the lubricant into the bearing, a substantially cylindrical journal for the bearing adapted to rotate therein in a direction from a maximum clearance between the bearing and the journal to a minimum clearance whereby the lubricant flow is induced in the same direction and a substantially constant pressure of the lubricant is created completely around the journal under conditions in which no external force is applied thereto.

4. A journal assembly including a bearing having a cross sectional spiral contour which extends 360 degrees such that the beginning and ending of the spiral within the same plane lie on the same radius to form a step portion therebetween, a lubricant within the bearing, means for introducing the lubricant into the bearing substantially at said step portion, a substantially cylindrical journal for the bearing adapted to rotate therein in a direction from a maximum clearance between the bearing and the journal to a minimum clearance whereby the lubricant flow is induced in the same direction and a substantially constant pressure of the lubricant is created completely around the journal under conditions in which no external force is applied so that, upon application of a force to the journal, diametrically opposite points of increased and decreased pressure result to oppose the force.

References Cited in the file of this patent

UNITED STATES PATENTS

| Number | Name | Date |
|---|---|---|
| 1,236,511 | Waring | Aug. 14, 1917 |
| 1,254,909 | Howe | Jan. 29, 1918 |
| 1,495,660 | Ziegler | May 27, 1924 |
| 2,093,521 | Howarth | Sept. 21, 1937 |
| 2,133,476 | Scaife | Oct. 18, 1938 |

FOREIGN PATENTS

| Number | Country | Date |
|---|---|---|
| 302,340 | Germany | Dec. 19, 1917 |
| 556,052 | Germany | Aug. 2, 1932 |